UNITED STATES PATENT OFFICE.

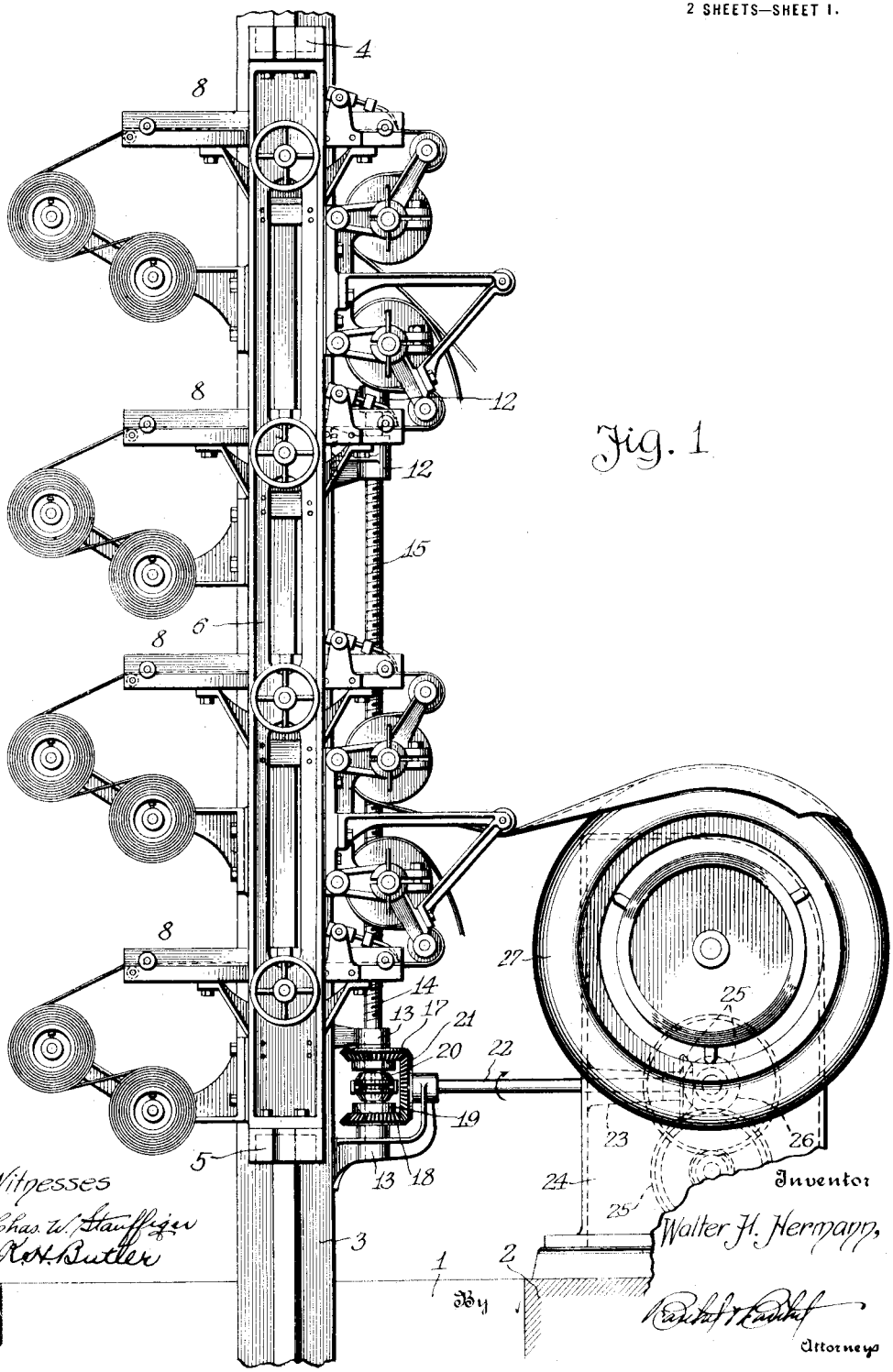

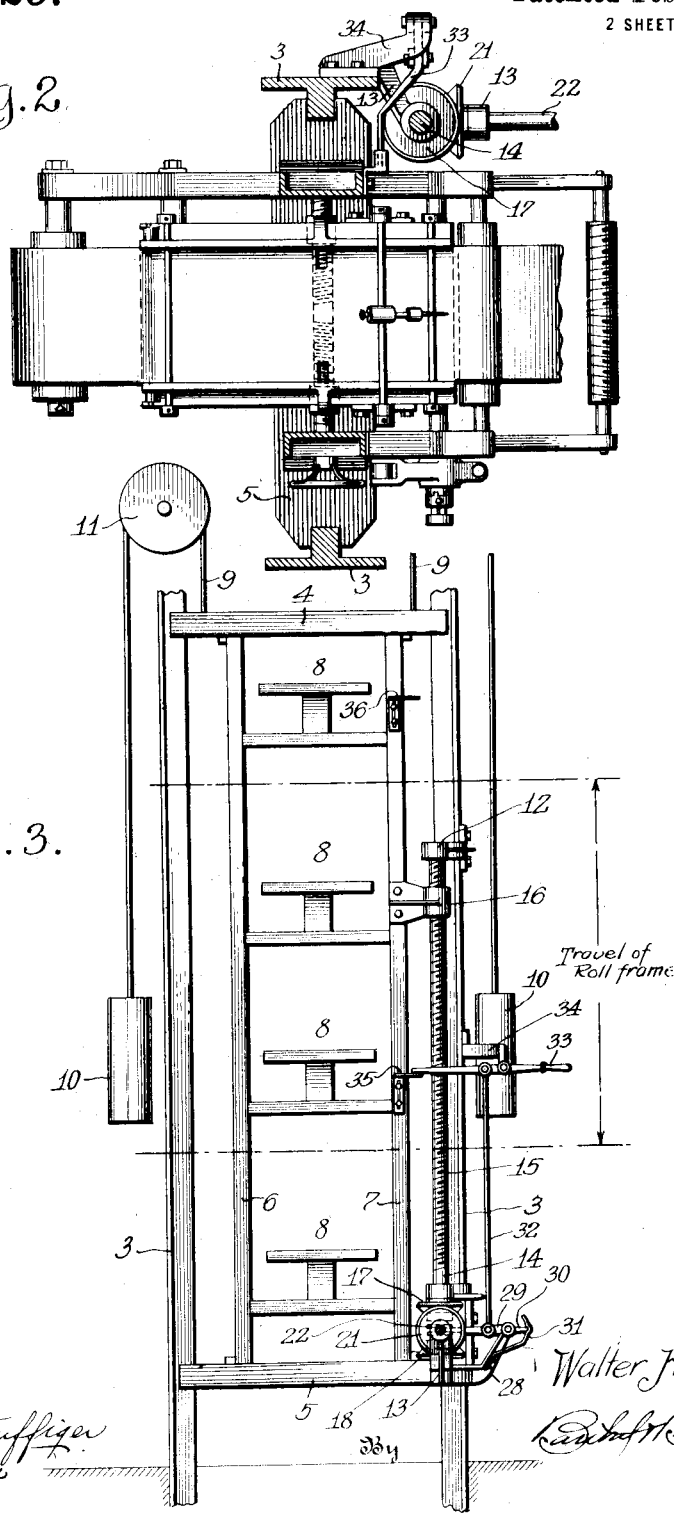

WALTER H. HERMANN, OF LANCASTER, OHIO, ASSIGNOR TO THE HERMAN TIRE BUILDING MACHINE COMPANY, OF COLUMBUS, OHIO, A CORPORATION OF OHIO.

TIRE-BUILDING MACHINE, (VERTICAL ADJUSTMENT.)

1,368,929.            Specification of Letters Patent.        Patented Feb. 15, 1921.

Application filed December 26, 1918. Serial No. 268,404.

*To all whom it may concern:*

Be it known that I, WALTER H. HERMANN, a citizen of the United States of America, residing at Lancaster, in the county of Fairfield and State of Ohio, have invented certain new and useful Improvements in Tire-Building Machines, (Vertical Adjustment,) of which the following is a specification, reference being had therein to the accompanying drawings.

In contradistinction to the stationary and horizontally shiftable tire building machines disclosed in my companion applications filed under even date, Serial Nos. 268,402 and 268,401 there is shown in this application a multiple stock supplying machine that is shiftable in a vertical plane, to place a desired size or grade of stock or tire material in position to be conveniently applied to a core or form. Stock rolls, guide tables, marking devices, tension rollers, tension devices therefor, and stretching rollers are the same as in my other cases, that is, arranged as units, and in this application the units are superposed and supported to be raised and lowered. Such a constructive arrangement minimizes floor space ordinarily required for such machines and permits of a large stock of material being at all times convenient for tire building purposes.

This particular type of machine will be hereinafter described, and reference will now be had to the drawings, wherein—

Figure 1 is a side elevation of the machine;

Fig. 2 is a horizontal sectional view of the same, and

Fig. 3 is a front elevation of the main framework of the machine on a smaller scale and showing the raising and lowering mechanism thereof.

In describing my invention by aid of the views herein referred to, I desire to point out that the same are intended as merely illustrative of an example by which my invention may be put into practice, and I do not care to limit myself to the precise construction and arrangement of parts shown. The following description is therefore to be broadly construed as including substitute constructions and arrangements of parts which are the obvious mechanical equivalent of those hereinafter referred to.

The reference numeral 1 denotes a well, opening or shaft that may be in a floor or suitable support and for a machine of great capacity it may be necessary to provide superposed floors with similar openings, somewhat similar to an elevator shaft.

3 denotes vertical opposed guideways or rails extending into or through the opening 1, said guideways or rails being suitably supported. Slidable on said guideways or rails are transverse beams 4 and 5 connected by uprights 6 and 7 constituting supports for a plurality of machine units generally designated 8, each machine unit including stock rolls, guide tables, marking devices, tension rollers, tension devices, and stretching rollers with some of the stretching rollers arranged to serve two units, as brought out in my companion application, filed Dec. 26, 1918, Ser. No. 268,402.

9 denotes cables or flexible members connected to the transverse beam 4 and having the ends thereof provided with counterweights 10, said cables or flexible members being trained over sheaves 11 suitably supported above the movable machines or at the upper end of the well in which the machines are raised and lowered. The counterweights 10 assist in raising and lowering the framework which supports the superposed machine units.

12 and 13 denote bearings carried by one of the guideways or rails 3 and journaled in said bearings is a vertically disposed rotatable shaft 14 having a screwthreaded portion 15 in screwthreaded engagement with a nut 16, carried by the uprights 7 of the main framework. The shaft 14 and its threads constitute a feed screw which when rotated, is adapted to raise or lower the framework supporting the machine units.

17 and 18 denote beveled gear wheels loose on the shaft 14, said beveled gear wheels having clutch hub portions 19 either of which is adapted to be engaged by a clutch member 20 between said hub portions, said clutch member being slidably keyed on the shaft 14 to rotate therewith and when in engagement with one of the hub portions 19 of the beveled gear wheels 17 and 18 impart movement to the shaft 14 from the beveled gear wheel which is driven. The clutch member 20 and its appurtenant parts are of a conventional form and constitute means for controlling the operation of the shaft 14.

21 denotes a beveled gear wheel meshing with the beveled gear wheels 17 and 18, the beveled gear wheel 21 being mounted on a shaft 22 journaled in the bearing 13 and a bearing 23 provided therefor in a housing 24 adjacent the well or opening 1. The housing 24 contains an electric motor 25, which through the medium of a suitable transmission mechanism generally designated 26, drives the shaft 22, and also imparts a rotary motion to a core or form 27 supported at the side of the housing 24 and adapted to have a tire body fabricated thereon.

28 denotes a bracket carried by the bearing 13 and extending at right angles thereto. Pivoted on the upper end of the bracket 28 is a fork or yoke arm 29 which engages the clutch member 20 for shifting said member into engagement with either of the clutch hubs 19 of the beveled gear wheels 17 and 18. The fork or yoke arm 29 has a detent 30 to engage a spring or yieldable member 31, carried by the bracket 28, said spring or yieldable member maintaining the arm 23 normally in a neutral position, that is, with the beveled gear wheels 17 and 18 idling on the shaft or feed screw 14.

32 denotes a rod having its lower end pivotally connected to the arm 29 and its upper end pivotally connected to an operating lever 33 fulcrumed on a bracket 34, carried by the guideway or rail 3 adjacent the shaft 14. The operating lever 33 is convenient to the operator or attendant of the machine at the housing 24, and said operating lever extends into the path of adjustable stops 35 and 36 carried by the uprights 7 of the main framework of the machine.

Assuming that the shaft 22 is being driven from the motor 25, and it is desired to shift the units of the machine so as to obtain another size or grade of stock to apply to the core 27 or stock previously applied thereto, it is only necessary to manually shift the operating lever 33 to establish a driving relation between the shafts 22 and 14. Then the shaft 14 will be revolved in a desired direction to shift the main framework in a desired direction, either to raise or lower the same and place a machine unit in front of the core 27. As the framework of the machine is raised or lowered, one of the stops 35 or 36 eventually impinges against the end of the operating lever 33 and actuates said lever to the extent that the clutch member 20 is shifted to a neutral position, thereby causing a cessation in the raising or lowering of the main framework, thus placing a unit in position before the core, so that the builder of the tire may obtain the previously selected stock or material from the machine for building a tire body on the core.

With the above in mind it is easy enough to picture a machine of greater capacity than that shown and to use such a machine it is only necessary to use a feed screw of sufficient length and provide an operating lever that may be set for selected stock, thus rendering the machine automatic to the extent of controlling the raising and lowering of the main machine framework.

What I claim is:—

1. The combination of vertical guideways, stock supplying units disposed one above the other and slidable between said guideways, and means adapted for bodily raising and lowering said units.

2. The same combination as set forth in claim 1, and wherein mechanism is set in action by means associated with each unit for stopping said raising and lowering means.

3. The combination of a rotary core, vertical guideways adjacent said core, a framework slidable between said guideways, superposed stock supplying units on said framework and either of which may be shifted into operative relation to said core, a feed screw supported by one of said guideways, a nut carried by said framework in threaded engagement with said feed screw, driving means at the lower end of said feed screw, and means controlling the operation of said driving means.

4. The same combination as set forth in claim 3, and wherein said driving means is operable from said rotary core and the controlling means includes stop and other mechanism to automatically effect a cessation in the operation of the feed screw.

5. The combination of a core, means for rotating said core, superposed stock supplying means for said core, movable in a vertical plane adjacent said core, and means operatable from said core rotating means for moving said stock supplying means.

In testimony whereof I affix my signature in the presence of two witnesses.

WALTER H. HERMANN.

Witnesses:
ANNA M. DORR,
KARL H. BUTLER.